United States Patent [19]
Seyferth et al.

[11] Patent Number: 4,720,532
[45] Date of Patent: Jan. 19, 1988

[54] ORGANOPOLYSILAZANE PRECURSORS TO SILICON NITRIDE-RICH MIXED SIC/SI$_3$N$_4$

[75] Inventors: Dietmar Seyferth, Lexington; Joanne M. Schwark, Cambridge, both of Mass.

[73] Assignee: Massachusetts Institute of Technology, Cambridge, Mass.

[21] Appl. No.: 899,471

[22] Filed: Aug. 22, 1986

[51] Int. Cl.$^4$ .............................................. C08G 77/04
[52] U.S. Cl. ......................................... 528/28; 528/14; 528/37; 528/38; 556/410; 556/412; 524/442; 525/477; 525/474; 501/88; 501/97
[58] Field of Search ................. 528/28, 14, 37, 38; 556/410, 412; 524/442; 525/477, 474; 501/88, 97

[56] References Cited

U.S. PATENT DOCUMENTS

| | | |
|---|---|---|
| 3,108,985 | 10/1963 | Weyer . |
| 3,853,567 | 12/1974 | Verbeek . |
| 3,892,583 | 8/1975 | Winter et al. . |
| 4,310,651 | 1/1982 | Baney et al. . |
| 4,312,970 | 1/1982 | Gaul, Jr. . |
| 4,482,669 | 11/1984 | Seyferth et al. . |
| 4,645,807 | 2/1987 | Seyferth et al. ............... 528/26 |
| 4,650,837 | 3/1987 | Seyferth et al. ............... 528/25 |

OTHER PUBLICATIONS

R. W. Rice, Amer. Ceram. Soc. Bull. 62:889–892 (1983).
Penn et al., J. Appl. Polymer Sci, 27:3751–61 (1982).

Primary Examiner—Melvyn I. Marquis
Attorney, Agent, or Firm—George W. Neuner; Ronald I. Eisenstein

[57] ABSTRACT

A method for preparing preceramic polymers is disclosed. This method includes the steps of (1) reacting in solution anhydrous ammonia with a mixture of R$^1$SiHX$_2$ (where R$^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms, and X is a halogen) and RSiX$_3$ (where R is H, a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms), thereby forming a mixture of precursor polymers; and reacting the precursor polymers in the presence of a basic catalyst capable of deprotonating the NH functions in the precursor polymers to form the preceramic polymer. Preferably, this preceramic polymer is treated with an electrophile compound. Pyrolyzing the polymer in an inert gas stream or ammonia atmosphere to form a ceramic material is also disclosed.

22 Claims, No Drawings

ORGANOPOLYSILAZANE PRECURSORS TO SILICON NITRIDE-RICH MIXED SIC/SI₃N₄

The Government has rights in this invention pursuant to contract number N00014-K-0322 awarded by the Department of the Navy.

The present invention relates to a process for preparing silicon-containing preceramic polymers useful for making silicon nitride and silicon nitride/silicon carbide ceramics and for their pyrolysis to such ceramic materials.

There is a great deal of interest in preceramic polymer materials, which can be pyrolyzed to yield silicon carbide, silicon nitride, silicon oxynitride and other silicon-based ceramic materials. R. W. Rice, *Amer. Ceram. Soc. Bull.*, 62: 889.892 (1983). Applications for such polymers include, among others:

1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers or as a binder for ceramic powders (with subsequent pyrolysis to form a ceramic body);
4. oxidation-resistant coatings on otherwise oxidizable materials (such as carbon/carbon composites) - after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc., of the body; and
6. formation of thin films of the ceramic material for electronics applications.

For instance, Penn et al., *J. Appl. Polymer Sci.*, 27: 3751-61 (1982) describe the preparation of silicon carbide-silicon nitride fibers from a polycarbosilazane precursor. Tris(N-methylamino) methylsilane monomer was formed by reaction of monomethylamine and methyltrichlorosilane in dry petroleum ether and a polycarbosilazane resin was formed by passing the monomer over glass Raschig rings at 520° C. The brittle polymer was soluble in methylene chloride and chloroform, etc. This product was spun into fibers, crosslinked in air and then pyrolyzed to give ceramic fibers.

Other polymer precursors for forming silicon carbide and silicon nitride ceramics have been described in U.S. Pat. Nos. 3,108.985; 3,853,567; 3,892,583; 4,310,651 and 4,312.970. These linear or crosslinked polymers and processes for producing ceramic materials have generally been found to be deficient in one or more ways.

U.S. Pat. No. 4,482,669 issued Nov. 13, 1984, describes organopolysilazane preceramic polymers whose pyrolysis gives a mixture of silicon carbide and silicon nitride wherein, generally, neither component is in large excess over the other. These polymers were obtained by the reaction of a base (such as an alkali metal hydride, amide, etc.) with the ammonolysis product of a dihalosilane, for example, $CH_3SiHCl_2$ which results in a polymerization process believed to include the *dehydrocyclodimerization* (DHCD) reaction shown in eq. 1.

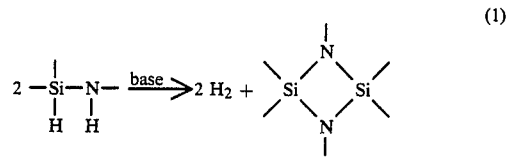

(1)

The action of a catalytic amount of the base on these cyclic oligomers links them together via such cyclodisilazane units into a sheet-like array. Treatment of, for example, the $CH_3SiHCl_2$ ammonolysis product by the base, usually KH (0.5-4 mol percent based on $CH_3SiHNH$ units), provides a polysilazane intermediate of type $[(CH_3SiHNH)_A(CH_3SiN)_b(CH_3SiHNK)_c]_n$, i.e. a "living" polymer which still contains reactive silylamide functions. This "living" W polysilazane intermediate can be treated with a suitable electrophile, such as $CH_3I$ or a chlorosilane, to "neutralize" the reactive silylamide functions. Ultimately, on pyrolysis in an inert gas stream ($N_2$ or Ar) to 1000° C., the yield of ceramic residue is high (80-85%). A typical composition of such a ceramic material is $0.9\ Si_3N_4 + 1.3\ SiC + 0.75\ C$. or, on a weight % basis, 67% $Si_3N_4$, 28% SiC and 5% C.

U.S. patent application Ser. Nos. 756,354, filed July 18, 1985, now U.S. Pat. No. 4,645,807, and 781,934, filed Sept. 30, 1985, now U.S. Pat. No. 4,650,837, describe methods for converting organosilicon polymers containing Si-H repeat units to new and useful preceramic polymers and ceramic materials. The preceramic polymers, which are prepared by reacting either an organopolysilane or a polycarbosilane with a silylamide result in preceramic polymers whose pyrolysis gives a mixture of silicon carbide and silicon nitride ceramic materials, which are generally rich in silicon carbide.

It would be useful to have a polymer precursor that is formed from readily available and relatively inexpensive starting materials, that is stable at room temperature, is fusible and/or soluble in organic solvents and whose pyrolysis can provide a high yield of ceramic products. It would also be useful to be able to have such a polymer precursor which forms a ceramic material upon pyrolysis that is rich in the silicon nitride component.

SUMMARY OF THE INVENTION

We have discovered a method for preparing preceramic organosilicon polymers, where the resultant ceramic material is generally richer in silicon nitride than obtained with the corresponding dihalosilane alone as initial starting material. The process comprises the following steps:

(a) reacting in solution anhydrous ammonia with a mixture of $R^1SiHX_2$ (wherein $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms, and X is a halogen) and $RSiX_3$ (wherein R is H, a lower alkyl group having from 1 to about 6 carbon atoms, a substituted or unsubstituted cycloalkyl group having from 3 to about 6 carbon atoms, or a substituted or unsubstituted lower alkenyl group having from 2 to about 6 carbon atoms, or a substituted or unsubstituted lower aryl group having from 6 to about 10 carbon atoms) thereby forming a mixture of precursor polymers; and (b) reacting said precursor polymers in the presence of a basic catalyst capable of deprotonating the NH functions in said precursors to form said preceramic polymer, thereby carrying out the DHCD reaction. Preferably, the resultant preceramic polymer is treated with an electrophile compound. In a preferred embodiment X is Cl, $R^1$ is a lower alkyl group and R is H or a lower alkyl group The polymer formed by this method can be pyrolyzed in an inert gas stream to form a black ceramic material. Pyrolysis of a preceramic polymer formed where $R^1$ is a lower alkyl group and R is H or a lower alkyl group under a stream of ammonia results in a white ceramic material.

DETAILED DESCRIPTION OF THE INVENTION

We have now discovered that by using the coammonolysis product of a mixture of a dihalosilane and a trihalosilane, one can obtain a preceramic polymer whose pyrolysis results in a ceramic material richer in silicon nitride than the polymer obtained by using the ammonolysis product of the corresponding dihalosilane alone. Additionally, the coammonolysis product is often more soluble than the ammonolysis product of the corresponding trihalosilane, and because an important requirement for a useful preceramic polymer is that it be processable, i.e., fusible, and/or soluble in organic solvents, the coammonolysis product is preferable.

Preferably, the dihalosilane is of the formula $R^1SiHX_2$, wherein $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms, while X is a halogen, preferably, fluorine, chlorine, bromine or iodine. More preferably, $R^1$ is a lower alkyl group. Most preferably, $R^1$ is $CH_3$. X is preferably chlorine.

Preferably, the trihalosilane has the formula $RSiX_3$, wherein R is hydrogen a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms and X is a halogen, preferably, fluorine, chlorine, bromine or iodine. More preferably, R is a hydrogen or a lower alkyl group Still more preferably R is hydrogen or $CH_3$. Most preferably, R is hydrogen. X is preferably chlorine.

The coammonolysis reaction is carried out in any organic solvent in which the two reactants are soluble. Solvents which may be used include ethers such as dialkyl ethers, particularly diethyl ether ($Et_2O$); cyclic ethers such as tetrahydropyran, 1,4.dioxane, preferably tetrahydrofuran (THF); glycol ethers; aliphatic hydrocarbons such as pentane, hexane; and aromatic hydrocarbons such as benzene, toluene, xylenes. Other useful solvents are well known to the person of ordinary skill in the art, based upon this disclosure. The $R^1SiHX_2/RSiX_3$ mixture is then reacted with ammonia in such a solvent to effect the coammonolysis reaction.

In a preferred embodiment of the present invention, the coammonolysis product is treated with catalytic quantities of a base capable of deprotonating the NH functions in the resultant coammonolysis product, for example, KH, in an organic solvent. A dehydrocyclodimerization reaction (DHCD) takes place, which results in a preceramic polymer that gives high ceramic yields upon pyrolysis. Preferably, the base is an alkali metal, an alkali metal hydride, an alkaline earth metal hydride, an alkali metal amide, an alkaline earth metal amide, a complex alkali metal hydride, e.g. KB (sec-Bu)$_3$H, LiAlH$_4$, etc., alkali and alkaline earth metal silylamides, an alkali metal organic compound and the like. More preferably, the base is KH. Only small amounts of the base are necessary (0.1–10 mole percent based upon the NH containing repeat unit) because the reaction is catalytic.

The coammonolysis product is reacted with the base in any organic solvent, in which the coammonolysis product is soluble without reaction. Such organic solvents include ethers, such as dialkyl ethers, preferably diethyl ether; cyclic ethers. for example, preferably, THF; glycol ethers, aliphatic hydrocarbons such as alkanes, arenes, and combinations thereof.

The temperature at which this reaction takes place generally ranges from about $-10°$ C. to about $+30°$ C. After the reaction is complete, the mixture may be quenched with an electrophile, EX, capable of reaction with residual silylamide functions. E is any organic group, preferably, a lower alkyl group or silyl group; X is preferably a halide, sulfate or sulfonate. The electrophile can be an alkyl halide, sulfate or sulfonate; a halosilane; or the like. Typically, $CH_3I$ or a chlorosilane is used although other equivalent electrophiles well-known to those skilled in the art can also be used. This quenching limits the reactivity of the "living" polymer intermediate.

The preceramic polymer produced by the DHCD reaction typically is a white solid, which is produced in virtually quantitative yield. When $R^1$ was $CH_3$, X was Cl and R was H, the proton NMR spectra of the products showed an increase in the $SiCH_3/SiH+NH$ proton ratio, while the relative $SiH/NH$ ratio was unchanged. This indicates that a hydrogen loss had taken place.

In the DHCD reactions, the molecular weight of the solid product was greater than that of the starting coammonolysis product, thus a polymerization reaction had occurred. The conversion of the oils which typically are formed in the coammonolysis reactions to the solids of the present invention results in a material that is more easily handled.

Pyrolysis of the white solid obtained in these base-catalyzed, DHCD reactions under argon from 50° to 950° C., typically produces black ceramic residues. The ceramic yields were generally excellent. These ceramic materials have a rich silicon nitride content.

Relatively pure silicon nitride material can be formed when the preceramic polymer is pyrolyzed in a stream of ammonia rather than of an inert gas such as nitrogen or argon. The ammonia reacts with the polymer at higher temperatures to cleave methyl groups from silicon, so that essentially all carbon is lost. For example, where $R^1$ is $CH_3$ and R is H, the pyrolysis of the preceramic polymer derived from the DHCD product of the 1:1 coammonolysis (in THF) product to 1000° C. in a stream of ammonia produced a white ceramic residue in high yield containing only 0.29% by weight C, with the remainder being silicon nitride. When both $R^1$ and R were $CH_3$, the pyrolysis of the preceramic polymer derived from the DHCD product of the 6:1 coammonolysis (in Et₂O) product to 1000° C. in a stream of ammonia produced a white ceramic residue containing only 0.36% by weight of carbon. Similarly, pyrolysis of a 3:1 CH₃SiHCl₂:C₂H₅SiCl₃ (coammonolysis product in Et₂O) KH-catalyzed DHCD (in THF) product to 1000° C. in a stream of ammonia produced an essentially pure white residue with a very faint brown tinge. However, alkenyl groups appear to be more intimately involved with the pyrolysis chemistry Pyrolysis of a control ammonolysis product of CH₂=CHSiCl₃ to 1000° C. in a stream of ammonia produced a brown ceramic residue. while pyrolysis of a 3:1 CH₃SiHCl₂:CH₂=CHSiCl₃ (coammonolysis in THF) KH.catalyzed DHCD (in THF) product in a stream of ammonia produced a ceramic that was black with touches of white and brown.

A wide range of R¹SiHX₂:RSiX₃ ratios can be used in preparing the coammonolysis product, the mole ratio can be for example from about 20:1 to 1:20, it preferably ranges from about 8:1 to 1:7. Generally, the higher the mole % of dihalosilane used, the more soluble is the coammonolysis product. However, this product generally forms a ceramic material in lower yields. In addition, at a high mole % of trihalosilane, the DHCD reaction has less effect. The DHCD reaction at high mole % of trihalosilane should be limited to the soluble reaction product. For certain halosilanes, however, the coammonolysis product obtained with high levels of trihalosilane has properties that are quite useful without a subsequent DHCD reaction. When a DHCD reaction is contemplated, the mole ratio of R¹SiHX₂:RSiX₃ is preferably from about 8:1 to about 1:6, more preferably from about 8:1 to about 1:2, even more preferably about 6:1 to about 1:1. A higher mole ratio of dihalosilane to trihalosilane, such as about 6:1 to 3:1, provides a coammonolysis product that is typically soluble, which, when subjected to a DHCD reaction, results in a preceramic polymer that provides excellent yields of ceramic material. However, a ratio of about 2:1 to 1:2. preferably about 1:1, produces a preceramic polymer whose pyrolysis in an inert atmosphere, typically, results in a greater percent of silicon nitride in the ceramic material than obtained on using the higher mole ratio of dihalosilane. Thus, depending upon the desired end product and reaction sequences, the mole ratio of dihalosilane:-trihalosilane will vary. The particular ratio to use in a given situation can readily be determined empirically by the desired end use based upon the present disclosure.

For example, ammonolysis of HSiCl₃ alone gives mostly insoluble, highly cross-linked products. The highest yield of soluble products (47%) was obtained when the HSiCl₃ ammonolysis was carried out at −20° C. (at 0° C. the yield of soluble product was 17%, at −78° C. it was 20%). However, these initially soluble silazanes become insoluble after the solvent is removed. Since the main requirement of a preceramic polymer is that it must be processable, i.e., fusible and/or soluble in organic solvents, ammonolysis of HSiCl₃ alone is not satisfactory.

When R is H, and R¹ is CH₃ and X is Cl, the preferred ratio of R¹SiHX₂:RSiX₃ ranges from about 8:1 to about 1:4; more preferably, the ratio is about 6:1 to about 1:2 when a DHCD reaction is used; more preferably about 6:1 to about 3:1 when one is concerned with the solubility of the starting materials; and about 3:1 to about 1:2, more preferably about 1:1 when one is interested in the resultant weight percent of the ceramic residue obtained after pyrolysis in an inert atmosphere; and 1:1 to about 1:4, most preferably about 1:3 when the coammonolysis product without a DHCD reaction is desired.

In either Et₂O or THF, the 6:1 and 3:1 ratios used in the coammonolysis produced polysilazane oils with molecular weights in the range 390–401 g/mol and 480 g/mol, respectively. When a 1:1 reactant ratio was used, waxes of somewhat higher (764–778 g/mol) molecular weights were obtained in both solvents. In the 1:1 reaction carried out in Et₂O the yield of soluble product was only 40%, but in THF it was nearly quantitative.

The oils produced in the 6:1 and 3:1 reactions in Et₂O are stable on long-term storage at room temperature in the absence of moisture (e.g., in an inert atmosphere box). However, the waxy product of 1:1 reactions in (Et₂O) and all the coammonolysis products prepared in THF formed gels (i.e., became insoluble) after 3–4 weeks at room temperature, even when stored in a nitrogen-filled dry box. (See Tables 1 and 2).

TABLE 1

COAMMONOLYSIS OF METHYLDICHLOROSILANE AND TRICHLOROSILANE IN DIETHYL ETHER MEDIUM. DEHYDROCYCLODIMERIZATION OF THE PRODUCTS.

| Reaction | CH₃SiHCl₂/HSiCl₃ Molar Ratio | Product | Yield (%) | MW | Ceramic Yield by TGA, % |
|---|---|---|---|---|---|
| Coammon- | 6 | oil | 74 | 390 | 33 |
| olysis | 3 | oil | 79 | 484 | 41 |
| in Et₂O | 1 | wax | 40 | 778 | 72 |
| DHCD | 6 | solid | 100 | 1300 | 85 |
| Reaction, | 3 | solid | 99 | 1250 | 88 |
| 1% KH in THF | 1 | solid | 93 | 1630 | 87 |

TABLE 2

COAMMONOLYSIS OF METHYLDICHLOROSILANE AND TRICHLOROSILANE IN THF MEDIUM. DEHYDROCYCLODIMERIZATION OF THE PRODUCTS.

| Reaction | CH₃SiHCl₂/HSiCl₃ Molar Ratio | Product | Yield (%) | MW | Ceramic Yield by TGA, % |
|---|---|---|---|---|---|
| Coammon- | 6 | oil | 91 | 401 | 28 |
| olysis | 3 | oil | 85 | 482 | 67 |
| in THF | 1 | wax | 94 | 764 | 78 |
| DHCD | 6 | solid | 96 | 1094 | 82 |
| Reaction, | 3 | solid | 97 | 942 | 82 |
| 1% KH in THF | 1 | solid | 93 | 1620 | 86 |

The integrated proton NMR spectra of the various coammonolysis products establish their *approximate* constitutions:

| CH₃SiHCl₂/HSiCl₃ ratio | Approximate Formula |
|---|---|
| 6:1 | [CH₃SiHNH]₁.₀[HSi(NH)₁.₅]₀.₁₇ |
| 3:1 | [CH₃SiHNH]₁.₀[HSi(NH)₁.₅]₀.₃₃ |
| 1:1 | [CH₃SiHNH]₁.₀[HSi(NH)₁.₅]₀.₃₇ |

These formulas carry no structural implications, they merely are average formulations. The HSiCl₃ component probably introduces both

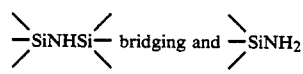

terminal groups into the structure. From these approximate formulas one can calculate expected % C. H, N and Si compositions and, in general, the agreement of observed % C, H and N for the 6:1 and 3:1 products with these values is good (±0.55%). (Analyses were not obtained of the waxes prepared in the 1:1 reactions).

The pyrolysis of these coammonolysis products was studied. The 6 $CH_3SiHCl_2$:1 $HSiCl_3$ ammonolysis product gives low ceramic yields on pyrolysis. Pyrolysis of the 3:1 products gives increased ceramic yields, while pyrolysis of the most highly cross-linked 1:1 ammonolysis products gives quite good ceramic yields*, 72% for the product prepared in $Et_2O$, 78% for that prepared in THF.

*Ceramic yield is defined as $$\frac{\text{weight of residue} \times 100}{\text{weight of sample pyrolyzed}}$$

Subjecting these coammonolysis products to the DHCD reaction, using KH as a base resulted in white solids in virtually quantitative yield. The solids are easier to handle and store than the oils. Pyrolysis of the white solids obtained in these KH-catalyzed DHCD reactions (under argon from 50°–950° C.) produced black ceramic residues, with the exception of the 1:1 THF ammonolysis-derived solid which left a brown residue. The ceramic yields were excellent (all greater than or equal to 82%, with the highest being 88%).

Analysis of bulk samples of the ceramic materials produced in the pyrolysis of the various KH-catalyzed DHCD products shows that a higher $Si_3N_4$/SiC ratio has been achieved (Table 3): for the 1:1 coammonolysis products-derived polymers, 86% $Si_3N_4$, 8% SiC and 5% C (THF coammonolysis) and 83% $Si_3N_4$, 11% SiC and 6% C ($Et_2O$ coammonolysis); for the 3:1 and 6:1 coammonolysis products-derived polymers: 77% $Si_3N_4$, 18-19% SiC and 4-5% C ($Et_2O$ coammonolysis) and 74% $Si_3N_4$, 20% SiC and 5-6% C (THF coammonolysis).

However, the KH-catalyzed DHCD reactions with the 1:3 coammonolysis-derived polymer were slow, producing soluble products in poor yields. Pyrolysis of this material produced a black ceramic.

There are situations where one desires a ceramic material and/or preceramic polymer that contains differing amounts of silicon carbide and silicon nitride. The present process can be used to result in a preceramic polymer that will typically produce a ceramic material that is enriched in silicon nitride when compared to reactions in which the precursor dihalosilane is used alone as the initial starting material.

For example, when $R^1$ was $CH_3$, X was Cl, and R was $CH_3$, $CH_2=CH$ or $C_2H_5$, the following results were obtained.

As control experiments, the ammonolysis of $CH_3SiCl_3$ alone was studied. Ammonolysis of this precursor in $Et_2O$ gave a 46% yield of soluble solid product, molecular weight 702 g/mol. ceramic yield (by TGA to 950° C.) 56%. A similar $CH_3SiCl_3/NH_3$ reaction in THF gave soluble solid product in 82% yield, molecular weight 672 g/mol, ceramic yield (by TGA) 69%. By proton NMR ($CH_3Si/\underline{NH}$ integration), the $Et_2O$ product may be formulated as $[CH_3Si(NH)_{1.3}]_x$, the THF product as $[CH_3Si(NH)_{1.6}]_x$. (This is only a rough approximation because integration of the broad $N\underline{H}$ signals is rather inaccurate). The results of the coammonolyses of $CH_3SiHCl_2$ and $CH_3SiCl_3$ are given in Tables 4 and 5.

TABLE 3

PRODUCTS OF THE REACTIONS IN TABLES 1 AND 2

| $CH_3SiHCl_2$/ $HSiCl_3$ Molar Ratio | Product | C, % | H, % | N, % | Si, % |
|---|---|---|---|---|---|
| 6 | of ammonolysis in $Et_2O$ | 17.75 | 7.53 | 25.80 | |
|  | of DHCD | 20.05 | 6.73 | 25.82 | |
|  | ceramic[a] | 10.36 | | 30.94 | 58.92 |
| 3 | of ammonolysis in $Et_2O$ | 16.19 | 7.31 | 27.04 | |
|  | of DHCD | 17.61 | 6.46 | 25.85 | |
|  | ceramic[b] | 9.35 | | 30.79 | 59.99 |
| 1 | of DHCD | 14.10 | 6.12 | 27.60 | |
|  | ceramic[c] | 9.10 | 0.70 | 32.56 | 56.52 |
| 6 | of ammonolysis in THF | 18.22 | 7.89 | 25.21 | |
|  | of DHCD | 19.89 | 6.85 | 25.08 | |
|  | ceramic[d] | 11.72 | | 29.71 | 59.03 |
| 3 | of ammonolysis in THF | 16.10 | 7.45 | 25.51 | |
|  | of DHCD | 18.00 | 6.71 | 27.32 | |
|  | ceramic[e] | 11.21 | | 29.77 | 59.09 |
| 1 | of DHCD | 12.42 | 5.97 | | |
|  | ceramic[f] | 7.74 | 0.54 | 34.29 | 57.17 |

[a]Calc. 77% (by weight) $Si_3N_4$, 18% SiC, 5% C
[b]Calc. 77% $Si_3N_4$, 19% SiC, 4% C
[c]Calc. 83% $Si_3N_4$, 11% SiC, 5.7% C
[d]Calc. 74% $Si_3N_4$, 20% SiC, 6% C
[e]Calc. 74% $Si_3N_4$, 20% SiC, 5% C
[f]Calc. 87% $Si_3N_4$, 8% SiC, 5.4% C In all cases, whether the solvent was $Et_2O$ or THF, oils were obtained in high yield. These were of low (300–500) molecular weight and their pyrolysis gave only low ceramic yields. The KH.catalyzed DHCD reaction of these coammonolysis products gave white solid products of higher (ca. two-to-threefold) molecular weight.

Based upon the $^1H$ NMR analysis, the following formulations of the products were generated:

| $CH_3SiHCl_2$/ $CH_3SiCl_3$ Molar Ratio | Reaction Solvent | Formula |
|---|---|---|
| 6 | $Et_2O$ | $[CH_3SiHNH]_{1.0}[CH_3Si(NH)_{1.5}]_{0.26}$ |
|  | THF | $[CH_3SiHNH]_{1.0}[CH_3Si(NH)_{2.1}]_{0.27}$ |
| 3 | $Et_2O$ | $[CH_3SiHNH]_{1.0}[CH_3Si(NH)_{1.1}]_{0.29}$ |
|  | THF | $[CH_3SiHNH]_{1.0}[CH_3Si(NH)_{1.1}]_{0.29}$ |
| 1 | $Et_2O$ | $[CH_3SiHNH]_{1.0}[CH_3Si(NH)_{1.5}]_{0.63}$ |
|  | THF | $[CH_3SiHNH]_{1.0}[CH_3Si(NH)_{1.8}]_{0.80}$ |

These are only approximate constitutions, but agreement of combustion analyses (C, H, N) was fairly good for the formulations given. The ceramic yields obtained on pyrolysis of these polymers were high: 78–82% for the products generated by initial coammonolysis in THF. In all cases, a black ceramic residue resulted when the pyrolysis to 950° C. was carried out in a stream of argon. As expected, the carbon content (in the form of SiC and free C) was higher than that of the $CH_3SiHCl_2$/$HSiCl_3$-derived ceramics (Table 6): 12–18% SiC. up to 9.5% carbon. Nonetheless, higher $Si_3N_4$ contents than those obtained when $CH_3SiHCl_2$ is used alone ( 67%) were obtained.

DHCD products of polysilazanes from ammonolysis in $Et_2O$: 75–76% $Si_3N_4$; 15–18% SiC; 7–9% C.

TABLE 4

COAMMONOLYSIS OF METHYLDICHLOROSILANE AND METHYLTRICHLOROSILANE IN DIETHYL ETHER AND DEHYDROCYCLODIMERIZATION OF THE PRODUCTS

| Reaction | $CH_3SiHCl_2/$ $CH_3SiCl_3$ Molar Ratio | Product | Yield (%) | MW | Ceramic Yield by TGA, % |
|---|---|---|---|---|---|
| Coammon- | 6 | oil | 75 | 376 | 21 |
| olysis | 3 | oil | 80 | 373 | 40 |
| in Et$_2$O | 1 | oil | 81 | 526 | 44 |
| | ½ | wax | 89 | 627 | — |
| | 1/6 | white solid | 65 | 642 | — |
| DHCD | 6 | solid | 97 | 1260 | 82 |
| Reaction, | 3 | solid | 100 | 795 | 78 |
| 1% KH | 1 | solid | 98 | 786 | 78 |
| in THF | ½ | white solid | 95 | 850 | 58 |
| | 1/6 | white solid | 90 | 1012 | 56 |

TABLE 5

COAMMONOLYSIS OF METHYLDICHLOROSILANE AND METHYLTRICHLOROSILANE IN THF AND DEHYDROCYCLODIMERIZATION OF THE PRODUCTS

| Reaction | $CH_3SiHCl_2/$ $CH_3SiCl_3$ Molar Ratio | Product | Yield (%) | MW | Ceramic Yield by TGA, % |
|---|---|---|---|---|---|
| Coammon- | 6 | oil | 81 | 311 | 26 |
| olysis | 3 | oil | 91 | 363 | 31 |
| in THF | 1 | oil | 89 | 484 | 44 |
| | ½ | white solid | 88 | — | — |
| | 1/6 | white solid | 98 | — | — |
| DHCD | 6 | solid | 72 | 1171 | 86 |
| Reaction, | 3 | solid | 84 | 1170 | 83 |
| 1% KH | 1 | solid | 100 | 838 | 82 |
| in THF | ½ | white solid | 92 | 1180 | 76 |
| | 1/6 | white solid | 95 | 925 | 71 |

TABLE 6

PRODUCTS OF THE REACTIONS OF TABLES 4 AND 5.

| $CH_3SiHCl_2/$ $CH_3SiCl_3$ Molar Ratio | Product | C, % | H, % | N, % | Si, % |
|---|---|---|---|---|---|
| 6 | of ammonolysis in Et$_2$O | 20.24 | 8.02 | | |
| | of DHCD | 21.85 | 7.09 | | |
| | ceramic[a] | 12.16 | 0.51 | 30.44 | 57.23 |
| 3 | of ammonolysis in Et$_2$O | 20.01 | 7.90 | | |
| | of DHCD | 21.67 | 7.26 | | |
| | ceramic[b] | 13.04 | 0.72 | 31.05 | 55.30 |
| 1 | of ammonolysis in Et$_2$O | 19.66 | 7.49 | | |
| | of DHCD | 21.04 | 7.29 | 22.20 | |
| | ceramic[c] | 11.36 | 0.61 | 31.90 | 56.35 |
| 6 | of ammonolysis in THF | 20.26 | 8.06 | 23.79 | |
| | of DHCD | 21.85 | 7.02 | | |
| | ceramic[d] | 12.87 | 0.60 | 29.35 | 53.94 |
| 3 | of ammonolysis in THF | 20.13 | 7.93 | | |
| | of DHCD | 22.05 | 7.03 | | |
| | ceramic[e] | 12.36 | 0.63 | 29.57 | 56.77 |
| 1 | of ammonolysis in THF | 19.53 | 7.42 | | |
| | of DHCD | 22.35 | 7.24 | | |

TABLE 6-continued

PRODUCTS OF THE REACTIONS OF TABLES 4 AND 5.

| $CH_3SiHCl_2/$ $CH_3SiCl_3$ Molar Ratio | Product | C, % | H, % | N, % | Si, % |
|---|---|---|---|---|---|
| | ceramic[f] | 11.19 | 0.63 | 31.01 | 56.36 |

[a]Calcd. 76% (by weight) Si$_3$N$_4$, 16% SiC, 7% C
[b]Calcd. 78% Si$_3$N$_4$, 12% SiC, 9% C
[c]Calcd. 80% Si$_3$N$_4$, 12% SiC, 8% C
[d]Calcd. 76% Si$_3$N$_4$, 15% SiC, 9% C
[e]Calcd. 75% Si$_3$N$_4$, 18% SiC, 7% C
[f]Calcd. 79% Si$_3$N$_4$, 14% SiC, 7% C Changing the "monomer" ratio from 6 to 3 to 1 does not vary the compositions of the final ceramic materials very much: the Si$_3$N$_4$ content varies by only 5%, while the SiC content shows a 6% range and the carbon content is within 2% for all the materials.

To produce a ceramic material containing only Si$_3$N$_4$, the white solid polysilazane derived from the DHCD of the oil obtained by ammonolysis of 6:1 CH$_3$SiHCl$_2$/CH$_3$SiCl$_3$ in Et$_2$O medium was pyrolyzed in a stream of ammonia (to 1000° C.). A white ceramic residue containing only 0.36% by weight C resulted.

Essentially the same reactions were carried out using vinyltrichlorosilane in place of methyltrichlorosilane (CH$_3$SiHCl$_2$/CH$_2$=CHSiCl$_3$ molar ratios of 6, 3 and 1; ammonolysis in Et$_2$O and THF medium; subsequent KH-catalyzed DHCD in THF: see Tables 7, 8, and 9). Control experiments involving the ammonolysis of CH$_2$=CHSiCl$_3$ alone, in Et$_2$O and in THF medium, were also performed. In both solvents, glassy white solids were obtained. The yield of soluble products in Et$_2$O was low (61%); in THF it was quantitative. The molecular weights were relatively high (1165 and 1185, respectively) and the ceramic yields obtained on pyrolysis to 950° C. were high (76% and 82%, respectively). This is a result, at least in part, of a greater incorporation of carbon. Analysis of the ceramic obtained in the pyrolysis of the CH$_2$=CHSiCl$_3$ ammonolysis (in THF) product showed a composition 71% Si$_3$N$_4$, 29% C.

The coammonolysis of CH$_3$SiHCl$_2$ and CH$_2$=CHSiCl$_3$ in Et$_2$O and in THF medium gave polysilazane oils in high yield, molecular weights 300-600 g/mol.

TABLE 7

COAMMONOLYSIS OF METHYLDICHLOROSILANE AND VINYLTRICHLOROSILANE IN DIETHYL ETHER. DEHYDROCYCLODIMERIZATION OF THE PRODUCTS

| Reaction | $CH_3SiHCl_2/$ $CH_2$=CHSiCl$_3$ Molar Ratio | Product | Yield (%) | MW | Ceramic Yield by TGA, % |
|---|---|---|---|---|---|
| Coammon- | 6 | oil | 86 | 305 | 43 |
| olysis | 3 | oil | 87 | 333 | 53 |
| in Et$_2$O | 1 | oil | 90 | 605 | 74 |
| DHCD | 6 | solid | 99 | 880 | 83 |
| Reaction, | 3 | solid | 98 | 999 | 84 |
| 1% KH | 1 | solid | 98 | 970 | 78 |
| in THF | | | | | |

TABLE 8

COAMMONOLYSIS OF METHYLDICHLOROSILANE AND VINYLTRICHLOROSILANE IN THF. DEHYDROCYCLODIMERIZATION OF THE PRODUCTS

| Reaction | $CH_3SiHCl_2/$ $CH_2=CHSiCl_3$ Molar Ratio | Product | Yield (%) | MW | Ceramic Yield by TGA, % |
|---|---|---|---|---|---|
| Coammon- | 6 | oil | 89 | 350 | 47 |
| olysis | 3 | oil | 92 | 361 | 57 |
| in THF | 1 | oil | 94 | 536 | 74 |
| DHCD | 6 | solid | 88 | 773 | 84 |
| Reaction, | 3 | solid | 100 | 716 | 78 |
| 1% KH in THF | 1 | solid | 99 | 777 | 85 |

TABLE 9

PRODUCTS OF THE REACTIONS OF TABLES 7 AND 8

| $CH_3SiHCl_2/$ $CH_2=CHSiCl_3$ Molar Ratio | Product | C % | H % | N % | Si % |
|---|---|---|---|---|---|
| 6 | of ammonolysis in $Et_2O$ | 22.80 | 7.86 | 23.91 | |
| | of DHCD reaction ceramic[a] | 24.48 17.06 | 6.86 | 23.51 28.33 | 54.62 |
| 3 | of ammonolysis in $Et_2O$ | 24.39 | 7.65 | 24.59 | |
| | of DHCD reaction ceramic[b] | 26.21 17.21 | 6.89 | 23.31 28.43 | 54.91 |
| 1 | of ammonolysis in $Et_2O$ | 26.83 | 7.08 | 24.73 | |
| | of DHCD reaction ceramic[c] | 27.66 20.87 | 6.48 | 25.14 29.09 | 49.85 |

[a]Calcd. 71% (by weight) $Si_3N_4$, 17% SiC, 12% C
[b]Calcd. 71% $Si_3N_4$, 17% SiC, 12% C
[c]Calcd. 73% $Si_3N_4$, 9% SiC, 18% C
[d]Calcd. 69% $Si_3N_4$, 19% SiC, 12% C
[e]Calcd. 70% $Si_3N_4$, 16% SiC, 13% C
[f]Calcd. 71% $Si_3N_4$, 11% SiC, 18% C Pyrolysis of the coammonolysis products gave higher ceramic yields, the higher the $CH_2=CHSiCl_3$ content in the chlorosilane mixture. Application of the KH-catalyzed DHCD reaction to the ammonolysis products in all cases gave white solids of higher molecular weight whose pyrolysis to 950° C. gave high (78–85%) ceramic yields. However, their $Si_3N_4$ content was lower and their carbon content (as SiC +free C) was higher than observed in the ceramics from the $CH_3SiHCl_2/HSiCl_3$ and $CH_3SiHCl_2/CH_3SiCl_3$ systems: For the $CH_3SiHCl_2/CH_2=CHSiCl_3$ ratio =6 and 3 products: 69–71% $Si_3N_4$; 16–19% SiC; 12–13% C. For the 1:1 products: 71–73% $Si_3N_4$; 9–11% SiC; 18% C.

A mixture of $CH_3SiHCl_2$ and $C_2H_5SiCl_3$ (3:1 molar ratio was treated with ammonia in $Et_2O$ and in THF at 0° C. In both cases, silazane oils, MW 360–370, were obtained in high yield. Their ceramic yields on pyrolysis to 950° C. were low (15% and 23%. respectively). Application of the DHCD reaction (1% KH in THF) to these oils in both cases gave white solids with increased MW (972 and 860, respectively) and increased ceramic yield on pyrolysis to 950° C. (81% and 78%, respectively). The pyrolysis product in each case was a black foam when the pyrolysis gas stream was argon Analysis of the ceramic products gave % C, N and Si values from which compositions of about 71–73% $Si_3N_4$, 14–17% SiC and 11–12% C could be calculated. Thus, there is essentially no difference between these results and the calculated composition of the ceramic product of the corresponding 3:1 $CH_3SiHCl_2/CH_2=CHSiCl_3$ system (70–71% $Si_3N_4$, 16–17% SiC, 12–13% C.)

In the case of the present polymers, as is seen in Table 10 some were self-curing and on pyrolysis gave ceramic fibers (those noted "yes"). Others melted when heated, so that the fibers were destroyed (those noted "no"). Conversion of the meltable fiber to an infusible fiber by a cure step prior to pyrolysis will enable one to melt spin these materials into fibers.

TABLE 10

CERAMIC FIBERS AND SiC POWDER COMPOSITES

| Chlorosilanes | Molar Ratio | Ammonolysis Solvent | Bar | Fiber on Pyrolysis[a] |
|---|---|---|---|---|
| $CH_3SiHCl_2/$ $CH_2=SiCl_3$ | 6/1 | $Et_2O$ | x[b] | Yes |
| $CH_3SiHCl_2/$ $CH_2=SiCl_3$ | 3/1 | $Et_2O$ | x | No |
| $CH_3SiHCl_2/$ $CH_2=SiCl_3$ | 1/1 | $Et_2O$ | x | No |
| $CH_3SiHCl_2/$ $CH_2=SiCl_3$ | 6/1 | THF | x | Yes |
| $CH_3SiHCl_2/$ $CH_2=SiCl_3$ | 3/1 | THF | x | No |
| $CH_3SiHCl_2/$ $CH_2=SiCl_3$ | 1/1 | THF | x | Yes |
| $CH_3SiHCl_2/$ $HSiCl_3$ | 6/1 | $Et_2O$ | x | Yes |
| $CH_3SiHCl_2/$ $HSiCl_3$ | 3/1 | $Et_2O$ | x | Yes |
| $CH_3SiHCl_2/$ $HSiCl_3$ | 1/1 | $Et_2O$ | x | Yes |
| $CH_3SiHCl_2/$ $HSiCl_3$ | 6/1 | THF | x | No |
| $CH_3SiHCl_2/$ $HSiCl_3$ | 3/1 | THF | x | No |
| $CH_3SiHCl_2/$ $HSiCl_3$ | 1/1 | THF | x | Yes |
| $CH_3SiHCl_2/$ $CH_3SiCl_3$ | 6/1 | $Et_2O$ | x | Yes |
| $CH_3SiHCl_2/$ $CH_3SiCl_3$ | 3/1 | $Et_2O$ | x | No |
| $CH_3SiHCl_2/$ $CH_3SiCl_3$ | 1/1 | $Et_2O$ | x | No |
| $CH_3SiHCl_2/$ $CH_3SiCl_3$ | 6/1 | THF | x | Yes |
| $CH_3SiHCl_2/$ $CH_3SiCl_3$ | 3/1 | THF | x | No |
| $CH_3SiHCl_2/$ $CH_3SiCl_3$ | 1/1 | THF | x | Yes |

[a]Yes = Fibers remained after heating to 1000° C. under Ar.
No = Fibers did not remain after pyrolysis to 1000° C.
[b]x means a bar was made and pyrolyzed to obtain a ceramic bar.

The "cure" step prior to pyrolysis can be accomplished when either R or $R^1$ is alkenyl by curing the fiber through hydrosilylation. This reaction can be induced by ultraviolet and other high energy radiation, as well as by chemical free radical sources and transition metal catalysts. These compounds can readily be selected by the person of ordinary skill in the art and include $H_2PtCl_6.6H_2O$, peroxide and azo compounds, preferably organic peroxides, such as benzoyl peroxide, more preferably azo compounds such as azobisisobutyronitrile and the like. Preferably, a radiation source is used.

UV irradiation, irradiation with an electron beam or an X-ray source, etc. will cure the alkenyl containing polymer. Subjecting the preceramic fiber to UV irradiation (Rayonet Reactor) for 2 hours results in an infusible fiber that does not melt upon subsequent pyrolysis under argon, producing ceramic fibers. By incorporating C=C into the coammonolysis product, this strategy can be broadly applied to the present invention. The addition of a third compound containing an unsaturated functionality to the ammonolysis mixture results in a mixture of oligomers. The particular amount to be added to the coammonolysis mixture will depend upon the desired use and compounds being used.

Fibers were prepared in the following manner: In the dry box, a few drops of toluene was added to a polymer sample and the resulting mixture stirred with a glass rod until a sticky residue resulted from which fibers could be drawn. These fibers (¼" to 2" in length) were placed in a boat, taken out of the dry box and placed in a tube furnace flushed with Argon. The fibers were heated to 1000° C. at 10° C./minute. The polymers listed in Table 10 were used in preparing fibers.

The present polymers can be used as binders for SiC powder processing.

Ceramic composite bars were prepared in the following manner:

In the dry box, a 100 ml. one-necked, round-bottomed flask was charged with 0.6 g polymer and 2.4 g of commercial Fujima SiC powder. The flask was removed from the dry box and charged with 25 ml of toluene. The flask was placed in an ultrasonic bath for at least 15 minutes. The toluene was then removed on a rotary evaporator and the residue then dried under vacuum at 0.03 mm Hg for at least ½ hour. The SiC/polymer residue was ground with a mortar and pestle to produce a fine powder. This powder was pressed in a 1.5"×0.5"×0.1" die at 6000 lbs. for 5 minutes. The bar was then isostatically pressed at 40,000 lbs. Finally, the bar was pyrolyzed under Ar in a tube furnace to 1000° C.

The polymers shown in Table 10 were used to form composite bars All bars retained their rectangular shape upon pyrolysis.

The invention will be further illustrated by the examples that follow:

I. GENERAL

All reactions and manipulations were carried out under a dry nitrogen atmosphere using standard Schlenk techniques or a Vacuum Atmospheres dry box. All solvents were distilled under nitrogen: diethyl ether and tetrahydrofuran from sodium benzophenone ketyl, and hexane from lithium aluminum hydride. Chlorosilanes were obtained from Petrarch Systems, Inc. or Silar Labs., Inc. and were distilled from magnesium filings prior to use. Anhydrous ammonia (Matheson) was dried by passing through a KOH-filled drying tube. Methyl iodide was distilled under nitrogen from $P_2O_5$. Potassium hydride (Alfa) was obtained as a 40% slurry in mineral oil which was filtered, washed with hexane and dried prior to use.

Proton NMR spectra were obtained on either a Jeol FX-90Q (90 MHz) or a Bruker WM-250 (250 MHz) using a $CDCl_3$ reference (7.24 ppm shift). Infrared spectra were obtained on a Perkin-Elmer Model 1430 infrared spectrophotometer.

Molecular weights were determined by cryoscopy in benzene.

Thermogravimetric analysis (TGA) yields were obtained using a Perkin-Elmer TGS.2 system. Samples were heated from 50° C. to 950° C. under an argon atmosphere at 10° C./min. Large-scale tube furnace pyrolyses to produce gram quantities of ceramics were performed in a Lindberg Model 59344 tube furnace with controller. Samples were heated from 200° C. to 1000° C. at 10° C./minute in an argon atmosphere. Analyses of all oils and polymers were performed by Scandinavian Microanalytical Labs, Herlev, Denmark. Ceramic analyses were performed by Galbraith Labs, Knoxville, Tenn.

II. AMMONOLYSIS REACTIONS

A typical reaction is described. All other ammonolyses of the $RSiCl_3$ alone or of mixtures of $CH_3SiHCl_2$ with $RSiCl_3$ (R=H, $CH_3$, $CH_2$=CH) were carried out using the same general procedure. For each $CH_3SiHCl_2/RSiCl_3$ molar ratio used, separate reactions were carried out in $Et_2O$ and in THF medium. The yields of soluble products (soluble in the reaction medium), the molecular weights, the ceramic yields (by TGA under argon) obtained on their pyrolysis and their analyses are given in the appropriate Tables (1–9).

A 1000 ml three-necked, round-bottomed flask equipped with a Dry Ice condenser, an overhead mechanical stirrer and a rubber septum was flame-dried while a stream of dry nitrogen was passed through. Dry diethyl ether (600 ml) was added and then 33.6 g (0.292 mol) of $CH_3SiHCl_2$ and 6.8 g (0.05 mol) of $HSiCl_3$. The solution was cooled to 0° C. (ice bath). The original septum was replaced with another septum through which a one-foot gas inlet tube passed. Gaseous ammonia then was bubbled into the solution at a moderate rate for 4.5 hours until ammonia was observed condensing on the −78° C. condenser. The ammonia inlet tube was replaced with a rubber septum after the addition of ammonia had been stopped.

The reaction mixture was allowed to warm to room temperature and stirred under nitrogen overnight. Filtration (in the dry box) removed $NH_4Cl$ and any other insoluble products of the reaction. The solids were washed with three 50 ml portions of ether. Trap-to-trap distillation of the solvent (25° C., 0.1 mm Hg) from the combined ether phases left a clear, mobile oil (15.0 g, 74% based on the ($CH_3SiHNH$) and [$HSi(NH)_{1.5}$] components). The oil was characterized by analysis (Table 3), by IR and $^1H$ NMR spectroscopy. The molecular weight was measured (cryoscopy in benzene) and a thermogravimetric trace was obtained (50°–950° C., 10° C. per minute) $^1H$ NMR (250 MHz, in $CDCl_3$): δ 0.17 (broad m, 2.6 H, $CH_3Si$), 0.85 (broad m, 1.3, NH), 4.37 (broad s, 0.25 H, SiH), 4.63 (broad s, 0.41 H, SiH) and 4.81 (broad s. 0.33 H, SiH). IR (thin film, $cm^{-1}$): 3380 (s), 2960(s), 2900(w), 2140-2120 (broad,s), 1545(w), 1405(m), 1255(s), 1200-1150 (broad, vs), 980-750 (broad, vs).

MW: 390 g/mol

TGA: 33% by weight ceramic residue, black solid

Anal.(Based on NMR-derived formula [$CH_3SiHNH$][$HSi(NH)_{1.4}$]$_{0.17}$) Calcd for $CH_{5.41}N_{1.24}Si_{1.17}$, C, 17.7; H, 8.05; N, 25.7 Found: C, 17.75; H, 7.53; N, 25.80.

III. KH-CATALYZED DEHYDROCYCLODIMERIZATION REACTIONS

One such experiment is described in order to provide details of the procedure used. All reactions were carried out in THF using 1 mol % of the KH catalyst. In all cases, the white solid polymer obtained after the $CH_3I$ quench was characterized by analysis and IR and $^1H$ NMR spectroscopy. The molecular weight was measured by cryoscopy in benzene and a thermal analysis trace (TGA, 50°–950° at 10° C./minute, under argon) was obtained. The results of these experiments are given in the Tables.

A 250 ml, three-necked, round-bottomed flask was equipped with a magnetic stir-bar, a gas inlet tube and two rubber septa and charged with KH (0.04 g. 1.0 mmol). The flask then was connected to the nitrogen line. Dry THF (100 ml) was added by syringe and then 6.355 g (0.1 mol, based on $CH_3SiHNH+[HSi(NH)_{1.5}]$ units) of the polysilazane oil (obtained by ammonolysis of a 1:1 molar ratio mixture of $CH_3SiHCl_2$ and $HSiCl_3$ in diethyl ether) dissolved in 20 ml of THF. The latter solution was added dropwise over a period of 20 minutes. Gas evolution ($H_2$) was observed. The resulting clear solution was stirred at room temperature under nitrogen for 1 hour. Subsequently, methyl iodide (0.46 g. 3.2 mmol) was added by syringe. An immediate white precipitate of KI formed. The mixture was stirred for 30 minutes at room temperature and then the solvent was removed by trap-to-trap distillation. To the residue was added 70 ml of benzene and the mixture was centrifuged to remove insolubles. The solution phase was trap-to-trap distilled (25° C., 0.03 mm Hg) to remove the benzene, leaving a white organic-soluble solid (5.41 g, 93% yield). (Generally, in all other such reactions, the reaction mixture was stirred for 1–18 hours at room temperature after the initial gas evolution was observed. In the present case, such longer reaction times led to formation of insolubles.) $^1$H NMR (250 MHz, in $CDCl_3$): $\delta 0.17$ (broad m, 2.5 H, $CH_3Si$), 0.94 (broad, 1.2 H, NH), 4.82 (broad s, 1.0 H, SiH).

IR($CCl_4$, $cm^{-1}$): 3480 (w), 3400(s), 2960(s), 2900(w), 2120(s), 1540(w). 1410(m), 1250(s), 1180-1130(broad,s), 1030(s), 970-850(broad,vs).

MW: 1630 g/mol

TGA (50°–950° C., 10° C. per minute, under argon): 87% ceramic yield (black solid).

Anal. Found: C, 14.10; H, 6.12; N, 27.60.

A 3 g sample of this product was pyrolyzed in a tube furnace under argon, leaving a residue of 2.4 g (80%) in the form of a chunk of black solid.

Anal. Found: C, 9.10; H, 0.70; N, 32.56; Si, 56.52.

Assuming that all nitrogen is present as $Si_3N_4$, that the rest of the silicon is present as SiC and that the remaining carbon is present as free carbon, one can calculate from this analysis the composition 1.0 $Si_3N_4+0.46$ SiC$+0.81$ C. or, by weight 83% $Si_3N_4$, 11% SiC and 6% C.

Pyrolysis of the white solid obtained from another such preparation (1:1 $CH_3SiHCl_2/HSiCl_3$ ammonolysis in THF followed by KH-catalyzed DHCD and $CH_3I$ quench; a 3.53 g sample) in a fused silica boat in a tube furnace in a stream of ammonia (25°–1000° C. within 3 hours) gave a *white* powder residue in 84% by weight yield (100% yield based on the silicon content of the polysilazane) Analysis indicated a carbon content of only 0.29%.

This invention has been described in detail with reference to the preferred embodiments thereof. However, it will be appreciated that those skilled in the art, upon consideration of this disclosure, may make modifications and improvements within the spirit and scope of the invention.

We claim:

1. A method for preparing preceramic organosilicon polymers, wherein the method comprises:
    (a) reacting in solution anhydrous ammonia with a mixture of $R^1SiHX_2$, wherein $R^1$ is a lower alkyl group having from 1 to about 6 carbon atoms, a substituted or unsubstituted cycloalkyl group having from 3 to about 6 carbon atoms, a substituted or unsubstituted lower alkenyl group having from 2 to about 6 carbon atoms, or a substituted or unsubstituted lower aryl group having from 6 to about 10 carbon atoms, and X is a halogen, and $RSiX_3$ wherein R is H. a lower alkyl group having from 1 to about 6 carbon atoms, a substituted or unsubstituted cycloalkyl group having from 3 to about 6 carbon atoms, or a substituted or unsubstituted lower alkenyl group having from 2 to about 6 carbon atoms, or a substituted or unsubstituted lower aryl group having from 6 to about 10 carbon atoms, thereby forming a mixture of precursor polymers; and
    (b) reacting said precursor polymers in the presence of a basic catalyst capable of deprotonating the NH functions in said precursors to form said preceramic polymer.

2. The method of claim 1 further comprising the additional step of treating said preceramic polymer with an electrophile compound.

3. The method of claim 1 wherein X is Cl, $R^1$ is a lower alkyl group and R is H or a lower alkyl group.

4. The method of claim 3 wherein $R^1$ is $CH_3$.

5. The method of claim 4 wherein R is H or $CH_3$.

6. The preceramic polymer formed by the method of claim 2.

7. The preceramic polymer formed by the method of claim 4.

8. The preceramic polymer formed by the method of claim 5.

9. The method of claim 1 wherein the mole ratio of $R^1SiHX_2:RSiX_3$ is from about 8:1 to about 1:6.

10. The method of claim 9 wherein the mole ratio is about 8:1 to about 1:2.

11. The method of claim 3 wherein the mole ratio of $R^1SiHX_2:RSiX_3$ is from about 8:1 to about 1:6.

12. The method of claim 11 wherein the mole ratio is about 6:1 to about 1:2.

13. The method of claim 4 wherein the mole ratio of $R^1SiHX_2:RSiX_3$ is from about 6:1 to about 1:6.

14. The method of claim 13 wherein the mole ratio is about 6:1 to about 1:2.

15. The method of claim 14 wherein the mole ratio is about 6:1 to about 3:1.

16. The method of claim 14 wherein the mole ratio is about 2:1 to about 1:2.

17. The method of claim 5 wherein the mole ratio of $R^1SiHX_2:RSiX_3$ is from about 6:1 to about 1:2.

18. The method of claim 17 wherein the mole ratio is about 6:1 to about 3:1.

19. The method of claim 14 wherein the mole ratio is about 2:1 to about 1:2.

20. The method of claim 1 wherein said basic catalyst is selected from the group consisting of alkali metals, alkali and alkaline earth metal hydrides, complex metal hydrides, alkali metal alkoxides, alkali metal and alkaline earth metal amides, alkali and alkaline earth metal silylamides and alkali metal organic compounds.

21. The method of claim 2 wherein the electrophile has the formula $E—X^1$ an organic or silyl group. and $X^1$ is a halide, sulfate or sulfonate.

22. The method of claim 21 wherein E is a lower alkyl group or silyl group.

* * * * *